United States Patent
Van Allen et al.

[11] 3,722,383
[45] Mar. 27, 1973

[54] UNIQUE WASTE-FREE CAMERA SYSTEM OF THE SELF-DEVELOPING TYPE

[75] Inventors: David Van Allen, Malden, Mass.; Frank W. Knight, Salem, N.H.

[73] Assignee: Polaroid Corporation, Cambridge, Mass.

[22] Filed: June 30, 1970

[21] Appl. No.: 51,191

[52] U.S. Cl. .................................... 95/13, 95/19
[51] Int. Cl. .................................... G03b 17/52
[58] Field of Search .................... 95/13, 19, 22, 14

[56] References Cited

UNITED STATES PATENTS

| | | | |
|---|---|---|---|
| 2,443,154 | 6/1948 | Wolff | 95/13 |
| 3,249,434 | 5/1966 | Land et al. | 95/14 X |
| 2,873,659 | 2/1959 | Bing et al. | 95/13 |
| 3,181,444 | 5/1965 | Takats et al. | 95/14 X |
| 3,537,784 | 11/1970 | Downey | 352/78 X |
| 3,249,031 | 5/1966 | Gold | 95/14 X |
| 3,412,664 | 11/1968 | Eloranta et al. | 95/13 |
| 3,270,644 | 9/1966 | Finelli | 95/13 |

Primary Examiner—John M. Horan
Assistant Examiner—Alan A. Mathews
Attorney—Brown and Mikulka, Robert L. Berger and William D. Roberson

[57] ABSTRACT

A self-developing type camera adapted to removably receive a two-section cassette. An elongated strip of photographic materials including alternately spaced photosensitive image-recording sheets and process fluid containing pod assemblies is initially housed within the first section of the cassette. An arrangement is provided in the camera for progressively withdrawing the elongated strip from the cassette's first section, sequentially advancing such strip through an exposure station, a processing station and an imbibition station of the camera, and then feeding the expended strip into the cassette's second section. Also, an arrangement is provided for mounting a plurality of discrete image-receiving sheets and sequentially positioning each such image-receiving sheet over an image-recording sheet after exposure of the latter and prior to its introduction into the camera's processing station. A door on the back of the camera facilitates the removal of each image-recording sheet after completion of the processing operation.

20 Claims, 8 Drawing Figures

PATENTED MAR 27 1973 3,722,383

INVENTORS
DAVID E. VANALLEN
FRANK W. KNIGHT

BY Brown and Mikulka
and
Robert L. Berger
ATTORNEYS

INVENTORS
DAVID E. VANALLEN
FRANK E. KNIGHT

BY Brown and Mikulka
and
Robert L. Berger
ATTORNEYS

UNIQUE WASTE-FREE CAMERA SYSTEM OF THE SELF-DEVELOPING TYPE

BACKGROUND OF THE INVENTION

1. Field of the Invention

This invention relates to photography and, more particularly, to an improved camera system of the self-developing type adapted to employ film products of a simplified type to provide substantially waste-free operation.

2. Description of the Prior Art

In diffusion-transfer photography, it has generally been the practice to employ film elements comprising a photosensitive image-recording sheet and an image-receiving photographic sheet incorporating various additional components, e.g., pods, leaders, rails, masks, bibs and traps, for controlling the spread of processing fluid therebetween. These auxiliary components represent significant elements of cost in the production of finished prints by the diffusion-transfer process. Additionally, after each photographic print of the diffusion-transfer type has been made, the photographer has traditionally been required to handle and dispose of considerable waste material. Such waste material not only includes the above-mentioned auxiliary film components, but also the processed negative emulsion bearing photographic sheet. This task has proved to be somewhat of an inconvenience to the operator and one which, in some instances, can be quite messy considering the fact that certain of these materials are wetted with processing chemicals.

Recently devised simplified film products eliminate the requirement for certain of the auxiliary film components mentioned above and otherwise reduce the cost of producing photographic prints by the diffusion-transfer process. Additionally, such simplified film products are adapted to be employed in substantially waste-free photographic operations. In this respect, reference is made to the applicants' copending application Ser. No. 51,250, filed on June 30, 1970, now U.S. Pat. No. 3,679,417, wherein such simplified film products are described in detail.

A continuing effort toward an overall simplification and improvement of operational procedures and techniques has been witnessed in the photographic industry. One of the strongest trends at this time is in the direction of systems which utilize cassettes that lend themselves to quick mounting in cameras and projectors. Certain of these systems greatly ease the operator's job in loading the film into and removing the film from a camera.

Quite obviously, there is a strong demand for an effective low-cost camera system of the self-developing type which utilizes simplified film products and employs a film handling cassette to facilitate not only the loading of the camera, but also the removal of expended photographic materials therefrom.

There has also been a strong trend in the industry towards automating the separate functions requisite to preparing a camera for exposure operations and/or associated with the transport of the film within the camera housing. In these regards, by replacing heretofore manually adjustable or operated mechanisms of the camera with automated systems, there is assured an improved success rate for producing pictures of higher overall subjective quality.

Typifying the innovations which are now witnessed in camera designs are automatic exposure control systems, integrally associated flash or electrical discharge illumination devices, film transport mechanisms operable in conjunction with the exposure devices and systems for processing exposed film frames within the camera housing.

Operation of most of these innovations requires that electrical power be available within the camera assembly. Conventionally, such power demands are met by standard varieties of batteries which are inserted into chambers formed within camera housings. The batteries are called upon to provide reliable levels of current output or capacity over their usable life spans. The life spans of batteries are limited and, near their terminus, the camera housings must be opened and replacement batteries must be inserted thereinto. This situation may require the camera housing to be larger than would be necessary in the case of a similar camera which was not automated. A failure to remain cognizant of the replacement or renewal requirement may result in a failure of one or more of the functional systems of the camera. It is apparent, therefore, that the overall reliability of camera designs is somewhat dependent upon the quality of their power supply and upon a continued awareness by the operator of battery operational status.

It has recently been recognized that certain of the limitations typically associated with supplying electrical power to automated camera systems may be eliminated without incurring unreasonable expense by providing a fresh power supply each time the camera is loaded with film.

One of the objects of this invention, therefore, is to provide an improved camera system of the self-developing type.

Another primary object of this invention is to provide a camera of the self-developing type adapted to employ simplified film products in producing photographic prints.

An important object of this invention also is to provide a camera system of the type indicated which lends itself to substantially waste-free operations.

A further object of this invention is to provide an improved camera system of the type indicated adapted to be loaded with film products housed in a cassette.

An additional object of this invention is to provide a camera of the type indicated that employs an improved cassette in which film products are initially retained and in which they are subsequently stored after having been expended in producing photographic prints.

A still further object of this invention is to provide an improved cassette for use in a camera of the self-developing type.

Also an object of this invention is to provide an improved camera system of the self-developing type which employs a cassette containing means for energizing the camera.

SUMMARY OF THE INVENTION

In its illustrated embodiment, the invention comprises a self-developing camera system adapted to produce photographic prints employing an elongated strip of photographic materials, comprising alternately spaced photosensitive image-recording sheets and pod assemblies having containers of processing fluid adapted to release such fluid responsive to a compressive force, and a plurality of discrete image-receiving sheets. Provided within the camera component of the system is an exposure station, a processing station and an imbibition station. The last stated station, i.e., the imbibition station, is preferably located behind the camera's exposure station and immediately adjacent a door hinged to the back of the camera and on which the supply of image-receiving sheets are initially mounted.

The elongated strip of photographic materials is initially coiled within a first section of a two-section cassette and an arrangement is provided within the camera component for progressively withdrawing the elongated strip from the cassette, sequentially advancing it through the camera's exposure, processing and imbibition stations, and subsequently introducing it into the cassette's second section. Means are provided within this latter section of the cassette for gripping the elongated strip once it has been introduced thereinto and for subsequently continually exerting a force thereon tending to draw it into the cassette.

The camera component also includes an arrangement for superposing each such image-receiving sheet over a respective image-recording sheet after exposure of the latter and prior to its being introduced into the camera's processing station. A trap of the pod assembly engages the superposed image-receiving sheet to facilitate its subsequent advancement along with its respective exposed image-recording sheet through the camera's processing station and into its imbibition station. Mounted within the camera's processing station are a pair of spreader members which exert a compressive force on the superposed sheets as they are advanced therebetween to first rupture the fluid container in advance thereof and then to effect a distribution of the released processing fluid as a layer therebetween.

Once the imbibition sequence has been completed, the operator may open the camera's door and remove the superposed image-recording sheet which now constitutes a finished photographic print. As the photographic materials comprising the elongated strip are expended in producing such photographic prints, they are automatically stored within the cassette's second section. At least the film transport function of the camera component is preferably automated being driven by a motor thereof, and each cassette houses a battery adapted to energize such motor.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF A PREFERRED EMBODIMENT

The production of a visible image by a diffusion-transfer process, whether of the black-and-white or full-color variety, has most frequently employed the use of two sheets of material, one of which includes a photosensitive image-recording layer and the other of which includes an image-receiving layer. In carrying out the photographic process after the photosensitive medium has been exposed to image-carrying light rays to record a latent image therein, a suitable processing fluid is spread as a thin layer between the two sheets of material by drawing them in superposed relationship between a pair of compressive force applying members while the fluid is being fed therebetween.

For example, in producing a black-and-white print by a diffusion-transfer process, a first flexible image-recording sheet may comprise a support formed of baryta paper, or of a plastic such as cellulose acetate, with a photosensitive layer on one side thereof in the form of a silver halide gelatin emulsion. The processing liquid may comprise an aqueous alkaline solution of a silver halide developer, a silver halide complexing agent and a thickening or film-forming agent such as sodium carboxymethyl cellulose, which last stated constituent facilitates the dispensing and distribution of the processing fluid and the adherence of the two sheets to one another once the fluid has been spread therebetween. A flexible image-receiving sheet may comprise a support consisting of the same materials employed to form the support in the photosensitive sheet and a gelatin or polyvinyl alcohol silver-receptive medium wherein a positive image may be formed. When the image-recording sheet is exposed to actinic light and subsequently superposed with respect to the image-receiving sheet with a layer of the processing fluid distributed therebetween, the developing reagent in the fluid acts to develop the exposed silver halide in the negative emulsion to silver and to dissolve the nonexposed silver halide to provide an image forming component. The soluble silver complex comprising the image forming component migrates to the silver-receptive stratum of the image-receiving sheet where it is reduced to silver to provide a fixed positive of the latent image initially recorded in the photosensitive emulsion.

For example, in producing a print in full-color by a diffusion-transfer process, a first flexible image-recording sheet may comprise a support formed of baryta paper, or of a plastic such as cellulose acetate, on which are carried in sequence a cyan dye developer layer, a red sensitive silver halide emulsion layer, a spacer layer, a magenta dye developer layer, a green sensitive silver halide emulsion layer, a spacer layer, a yellow dye developer layer and a blue sensitive silver halide emulsion layer. A second flexible image-receiving sheet for use with this type of image-recording sheet may include a dye receptive layer comprising a dyeable polymer carried on a baryta paper, or a plastic such as cellulose acetate, support.

A processing composition suitable for use with these sheet materials may comprise a liquid which, similar to the processing liquid employed in the black-and-white process, is preferably of a generally viscous nature. A suitable viscosity-imparting agent for use in such a processing fluid is sodium carboxymethyl cellulose. When spread between the image-recording and image-receiving sheets, the processing liquid permeates or migrates into the various photosensitive and dye developer layers of the image-recording sheet. During permeation into the dye developer layers, unreacted dye developer contained in these layers is dissolved in the processing liquid and transported, in solution, into respective photosensitive layers to distribute unreacted dye developer in those layers. Where the dye developer, transported to the photosensitive layers, reacts with the exposed silver halide, it is oxidized as a function of the amount of silver halide reduced to silver while the oxidation product of the developer forms an image that is substantially co-extensive with the developed silver.

Preferably, the dye developer utilized is selected for its property of having an oxidation product as a result of silver development which is of considerably lower solubility in the liquid processing composition than the unreacted dye developer itself. Under these conditions, the oxidation product is substantially immobilized or retained in the respective photosensitive layers.

It is these means, namely the formation of an insoluble oxidation product, i.e., an oxidation product which is at least sufficiently less soluble so that it will not diffuse to the image-receiving sheet during imbibition, that provides the principal mechanism for controlling the transfer of dye image-forming components to the image-receiving sheet. Thus, portions of the dye developer which have become oxidized are exhausted or made unavailable for dye image formation on the positive or image-receiving element. This immobilization of dye developer may also be due in part to a tanning effect on the emulsion by oxidized developing agent and in part to a localized exhaustion of alkali as a result of development.

At the time that the dye developer is developing silver and providing an insoluble oxidation product, an imagewise distribution of unoxidized and unreacted dye developer is formed in the negative material in places where unexposed silver halide grains are present or in places where exposure and subsequent development is less complete. Dye developer present in solution in this imagewise distribution is transportable, at least in part, by imbibition to the image-receiving sheet. The dye-receiving layer of that sheet is dyed or otherwise colored by the transported and unreacted dye developer where the dye developer is deposited to provide the desired reverse image in color of the latent image initially recorded in the image-recording sheet.

The image-receiving sheet, when stripped from the image-recording sheet, will contain substantially only dye developer which provides the desired color positive image. In this regard, the image-receiving element, during the processing thereof, is maintained free of appreciable amounts of material which, during the processing of the film unit or which in the presence of light and air, will impart to the image-receiving sheet a color that would adversely affect the visibility of the image of dye developer formed therein.

Film systems of these types, including appropriate processing compositions, as well as of other types applicable for use in connection with the present invention for producing fully developed black-and-white and full-color images are well known in the art. For instance, typical such systems are disclosed and described in greater detail in U.S. Pat. No. 2,543,181 of E. H. Land issued on Feb. 27, 1951 and U.S. Pat. No. 2,983,606 of H. G. Rogers issued on May 9, 1961. It should be clearly understood, however, that the present invention is not directed to specific film structures, or to the chemistry by which images are formed in an exposed photosensitive material and/or formed in an image-receiving material associated therewith. To the contrary, the present invention is equally applicable for use with a variety of film structures and processing fluids other than those set forth by way of example herein.

Figure 1:
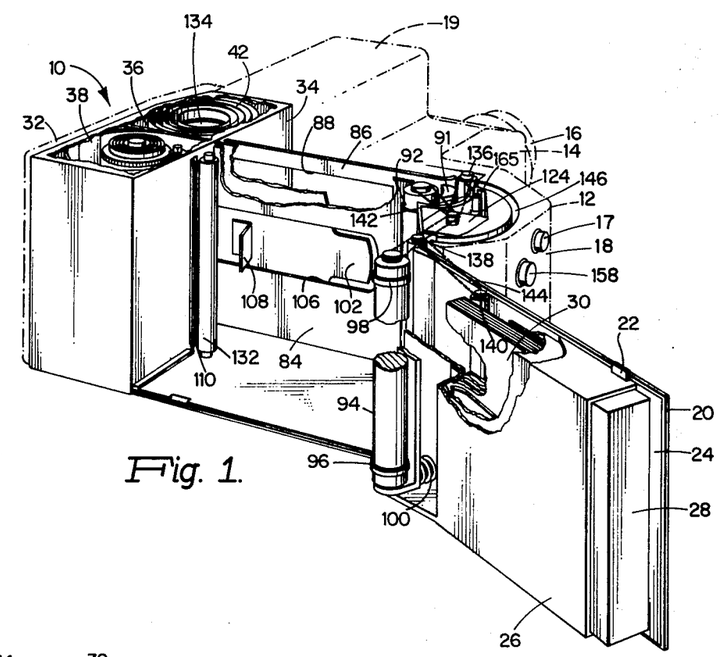
FIG. 1 is a diagrammatic rear perspective view of the camera system of this invention.

The illustrated preferred embodiment of this invention may best be understood by first referring to FIG. 1 of the drawings which shows a camera system 10 capable of producing photographic prints by a diffusion-transfer process in a waste-free operation.

The camera component 12 of this system 10 comprises a light-tight enclosure 14 which serves to connect the camera's lens and shutter assembly 16, the operation of which is controlled by a shutter release button 17, to the camera's back section 18. Conveniently positioned on the camera's housing is a rangefinder-viewfinder 19 which may take a conventional form. Access into the camera 12 is provided by a hinged door 20 having a latch 22 facilitating its being "locked" in its closed position. Mounted from the inside face 24 of the door 20 is a bracket 26 configured to slideably receive a magazine 28 containing a plurality of discrete photographic image-receiving sheets 30.

Figure 4:
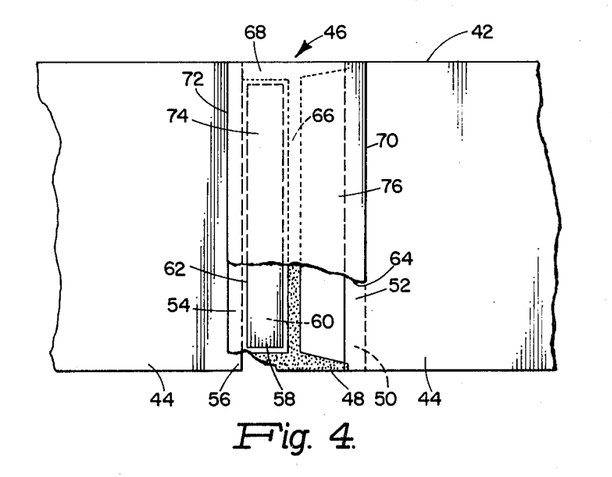
FIG. 4 is a fragmentary diagrammatic plan view, partially cutaway, of the elongated strip of photographic materials employed in the camera system of FIG. 1.

The camera 12 also includes a compartment 32 for removably receiving a cassette 34 comprising a first section 36 and a second section 38. Initially coiled within the cassette's first section 36 is an elongated strip of photographic materials 42, the component parts of which are best shown in FIG. 4 of the drawings. As may be seen therein, the elongated strip of photographic materials 42 is formed of a plurality of alternately spaced photosensitive image-recording sheets 44 and pod assemblies 46. Preferably, the elongated strip 42 includes the same number of image-recording sheets 44 and pod assemblies 46 as the number of image-receiving sheets 30 housed in the magazine 28. Also, each such image-recording sheet 44 is of substantially the same dimension and configuration as the image-receiving sheets 30 in order to facilitate pairs of such sheets 30 and 44 being superposed one over the other within the camera 12 for processing purposes.

As indicated, adjacent photosensitive image-recording sheets 44 are connected together by the pod assemblies 46. In this connection, each pod assembly 46 includes a carrier sheet 48 preferably having one of its edge portions 50 lapped under and attached to the trailing lateral edge portion 52 of one of its adjacent image-recording sheets 44 and its other lateral edge portion 54 lapped over and attached to the leading lateral edge portion 56 of the other image-recording sheet adjacent thereto. Each carrier sheet 48 may, for instance, be formed of a flexible baryta paper which is bonded to the adjacent image-recording sheets 44 by any suitable adhesive. Mounted on each carrier sheet 48 and extending laterally thereacross intermediate of, and in spaced apart relationship to, the carrier sheet's lateral edge portions 50 and 54 is an elongated rupturable pod or container 58 in which is initially retained a quantity of processing fluid 60, of a type previously indicated, slightly in excess of that required to treat the surface of one image-recording sheet 44.

Pods or containers of this general type are now well known and may, for instance, be formed of sheet materials, which are flexible and deformable, bonded together in the vicinity of their peripheral edge surfaces to form a cavity therebetween containing the processing fluid 60. In this manner, whenever an externally mounted force applying member is pressed against the container 58, an hydraulic pressure is transmitted to the processing fluid 60 retained therein which, when such pressure reaches a predetermined level, causes the container to rupture and the fluid to be released therefrom. It is desirable that the walls of the container 58 be substantially impervious to the processing fluid 60 and inert to attack by that fluid. Typically, they may consist of an outer layer of pouch or glassine paper, an intermediate layer of lead foil and an inner liner of polyvinylchloride material. Under proper pressure and temperature conditions, the polyvinyl liners may be bonded together to effect the sealing of the fluid-filled cavity.

In order that the fluid 60 within the container 58 is released therefrom in a predetermined manner upon rupture thereof, i.e., in the direction of one of the adjacent image-recording sheets 44, it is important that the seal along the lateral edge 62 of the container be substantially weaker than the seals along the other marginal sections thereof. This result may readily be effected during fabrication of the container by appropriately adjusting the heat and/or pressure employed to effect the weakened seal along its lateral edge 62. Any suitable adhesive may be employed to attach the pod or container 58 to its carrier sheet 48.

Overlying each carrier sheet 48 and container 58 mounted thereon is another sheet of flexible material 64 which, for instance, may also be formed of baryta paper. A relatively narrow lateral portion 66 of this sheet 64 is bonded by a suitable adhesive to the carrier sheet 48 adjacent the rupturable container 58 on the side thereof removed from its lateral edge 62. Also, the two longitudinal edge portions 68 of this sheet 64 are bonded in a similar manner to the adjacent sections of the carrier sheet 48. It will be noted that the lateral edges 70 and 72 of the sheet 64 respectively overlap the adjacent longitudinal edges 52 and 56 of the leading and trailing photosensitive image-recording sheets 44 connected to each pod assembly's carrier sheet 48. Thus, the flexible sheet 64 is effectively divided into a first section overlying and extending beyond the container 58 constituting a bib 74 and a second section constituting a trapping sheet 76. Means are therefore provided as part of each pod assembly 46 in the form of the bib 74 for controlling the flow of fluid 60 as it is released from the container 58 onto the trailing image-recording sheet 44 connected to that pod assembly. Also, means are provided on each pod assembly 46 in the form of a trapping sheet 76 for cooperating with the section of the carrier sheet 48 adjacent thereto to define a space wherein excess processing fluid 60 spread across the other image-recording sheet 44 attached to that particular pod assembly may be trapped or accumulated. Film products of these types adapted to be employed in the camera system of the present invention are the subject of the applicants' copending application, Ser. No. 51,250, filed on June 30, 1970, now U.S. Pat. No. 3,679,417 entitled Simplified Diffusion-Transfer Film Products filed on Turning now to FIGS. 1 and 3 of the drawings, it will be seen that the camera 12 further includes an exposure station 78, a processing station 80 and an imbibition station 82. Preferably, the imbibition station 82 is located immediately behind the exposure station 78 and intermediate the latter mentioned station and the supply of image-receiving sheets 30 mounted on the camera's hinged door 20.

Figure 3:
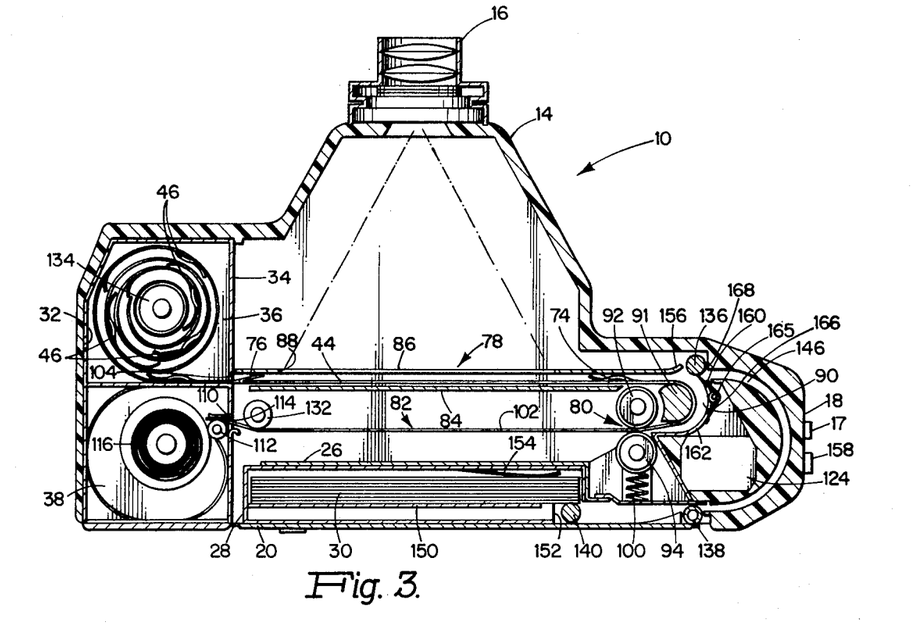
FIG. 3 is a diagrammatic sectional view of the camera system shown in FIG. 1 at such time as the first photosensitive image-recording sheet of the film is disposed in position for exposure.

The camera's exposure station 78 includes a support plate 84, on which the image-recording sheets 44 of the elongated strip 42 are adapted to be sequentially positioned to facilitate exposure operations. Overlying the plate 84 and extending in parallel spaced apart relationship thereto is a picture framing plate 86 provided with a rectangular aperture 88 which serves to define the area of each image-recording sheet 44 adapted to receive image-carrying light rays from the lens-shutter assembly 16 during exposure operations. The spacing between the plates 84 and 86 is such as to facilitate the proper positioning of the image-recording sheets 44 for exposure purposes while permitting the pod assemblies 46 associated with such sheets to be advanced therebetween without effecting a rupture of their fluid filled containers 58.

Adjacent the end of the support plate 84 furthermost removed from the cassette 34 is a guide track arrangement 90 including a turning bar 91 configured to effect a 180° reversal in the direction of movement of the elongated strip of photographic materials 42 as they are advanced in a right-handed direction (as viewed in the drawings) from the camera's exposure station 78. Thus, this guide track arrangement 90 serves to introduce the elongated strip of photographic materials 42 as they are advanced from the exposure station 78 into the camera's processing station 80 and imbibition station 82, which last two mentioned stations are located on the opposite side of the exposure station from the lens-shutter assembly 16.

The camera's processing station 80 includes a pair of fluid spreading rollers 92 and 94, which may take a conventional form. As such, the former of these elements, i.e., the roller 92, may be formed with a substantially uniform diameter across its entire length and mounted within the camera 12 for rotation about an axis which is fixed against any translatory movement. In contrast to the roller 92, the roller 94 may include a pair of annular collars 96 and 98 spaced a distance apart along the length of that roller slightly less than the width of the image-recording sheets 44. For example, in producing full-color photographic prints, the radial height of these collars 96 and 98 would be on the order of 0.007 inches. As will subsequently become apparent, these collars 96 and 98 are initially seated against adjacent sections of the roller 92 and serve first to establish an initial spacing between such rollers to facilitate the introduction of the elongated strip 42 therebetween and then subsequently to establish the thickness of the layer of processing fluid 60 distributed between respective pairs of superposed image-recording sheets 44 and image-receiving sheets 30 as they are advanced through the processing station 80. It will be noted that the fluid spreading roller 94 is mounted from the inside face 24 of the camera's door 20 in a manner facilitating a limited amount of translatory motion towards and away from the roller 92 under the influence of a spring 100. With the camera's door 20 disposed in its closed position and prior to loading the camera with film, the spring 100 causes the annular collars 96 and 98 of the roller 94 to be seated against the adjacent portions of roller 92.

Figure 2:
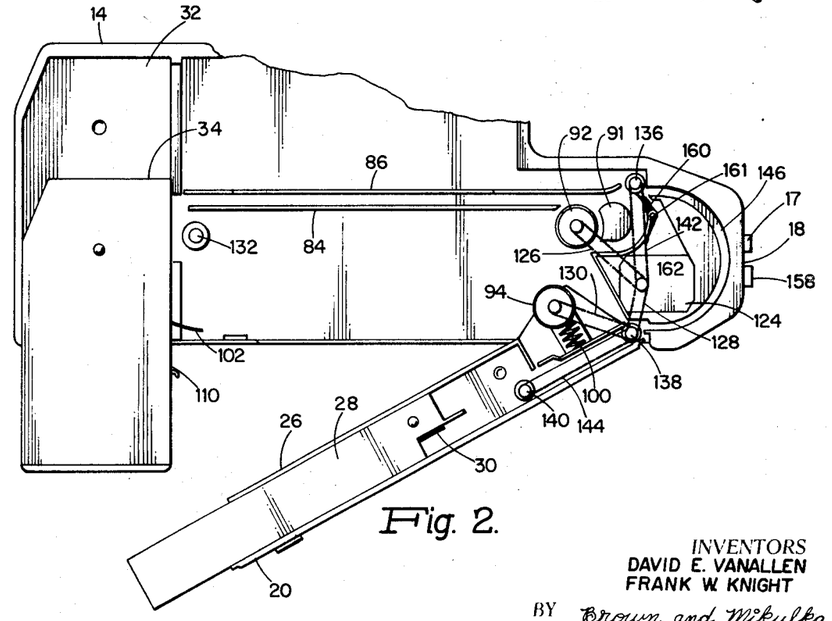
FIG. 2 is a fragmentary diagrammatic sectional view of the camera system shown in FIG. 1 illustrating such camera system being loaded with film.

As illustrated in FIG. 2 of the drawings, loading of the camera 12 with film is effected by first sliding a fresh cassette 34 into the camera's compartment 32 and inserting a fresh magazine 28 of image-receiving sheets 30 into the bracket 26 on the door 20. It is important to note that, in addition to the image-recording sheets 44 and pod assemblies 46, the elongated strip of photographic materials 42 also includes a specially configured leader 102. As may be seen in FIG. 2, the leading edge of this leader 102 initially extends from the cassette 34 through a light sealed elongated aperture 104 of the cassette's first section 36. In the process of inserting the cassette 34 into the camera's chamber 32, this leading edge of the leader 102 passes through an elongated slot 106 of the support plate 84 to rest against the picture framing plate 86. In this position, and with the door 20 still disposed in its fully open position, the operator may grip the leader 102 and draw it along the slot 106 of the support plate 84 in the direction away from the cassette 34 until its leading edge is disposed between the support plate and framing plate 86 at a point just in front of the end of the slot 106. Attached to the leader 102 is a tab 108 which, at such time, extends into the slot 106. By gripping the tab 108 and drawing it along the slot 106 in the direction away from the cassette 34, the operator can advance the leading portion of the leader 102 along the camera's guide track arrangement 90 and through the processing station 80 to a point within the imbibition station 82 where it is once again available to him. At this time, the operator may again grip the leader 102 and advance its leading edge into the cassette's second section 38 through an elongated opening 110 thereof.

Figures 7, 8:
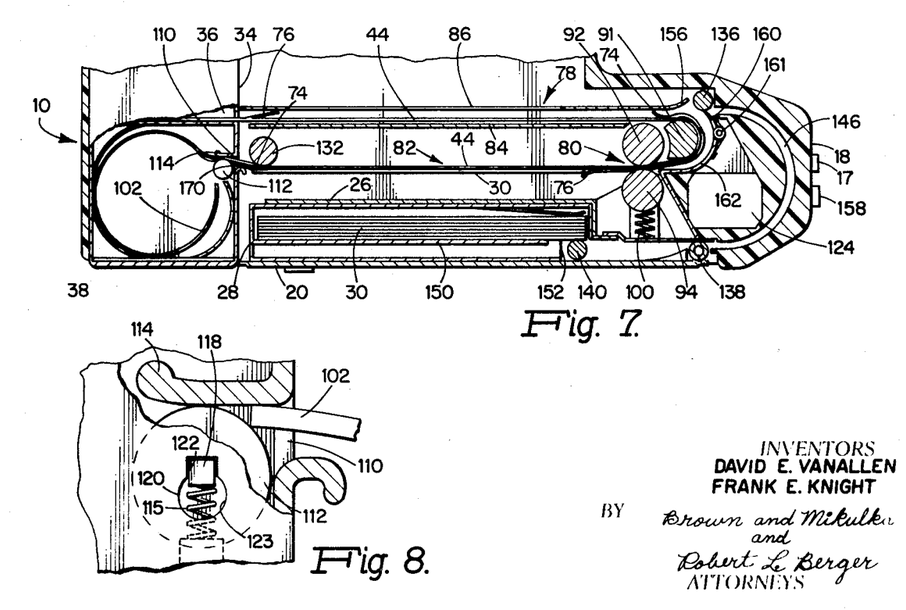
FIG. 7 is a view similar to FIG. 5 at such time as the first superposed image-receiving and exposed image-recording sheets are positioned in the camera's imbibition station.
FIG. 8 is a fragmentary diagrammatic view of the mechanism within the cassette for drawing expended sections of its elongated strip of photographic materials back into its second section.

The second section 38 of the cassette 34 includes means for continually exerting a force on the strip of photographic materials 42 tending to draw such strip thereinto once the leading edge of its leader 102 has been introduced through the opening 110. A preferred form of such means is best illustrated in FIG. 8 of the drawings. As shown therein, a friction roller 112 is mounted within the cassette's section 38 so as to extend across the elongated opening 110. This roller 112 is initially seated against a support member 114 under the force of a spring 115. A clock-spring 116 connected to the friction roller 112 continually exerts a force thereon tending to effect a rotation thereof in a counterclockwise direction as viewed in FIGS. 3 and 8. However, a specially configured mounting arrangement for the friction roller 112, which includes a square pin 118 and uniquely configured recesses 120 formed in mounting brackets 121 in which brackets respective ends of such pin are disposed, precludes any rotation of the roller as long as it remains seated against the support member 114. In this connection, when the roller 112 is seated against the support member 114, the ends of the pin 118 are seated in closely mating rectangular-type sections 122 of the recesses 120. It will be appreciated that, when the leading edge of the leader 102 is introduced into the cassette's section 38 through the elongated opening 110, it is wedged between the friction roller 112 and support member 114 causing the roller to be displaced away from the support member to a point where the respective ends of the pin 118 rest in the enlarged circular-type sections 123 of the recesses 120. At such time, i.e., when the pin 118 is disposed in the circular-type enlarged sections 123 of the recesses 120, the friction roller 112 is free to rotate within the cassette 34 under the influence of the clockspring 116. This clockspring 116 is carefully selected so as to tension the elongated strip of photographic materials 42 without by itself causing an advancement of such elongated strip within the camera system 10. As shown in FIG. 3, when the leading edge of the leader 102 has been inserted between the friction roller 112 and its support member 114, the first image-recording sheet 44 of the elongated strip 42 has been positioned within the camera's station 78 for its subsequent exposure.

Subsequent advancement of the elongated strip of photographic materials 42 within the camera 12 is effected by the force exerted thereon by the fluid spreading rollers 92 and 94, which are connected to a motor 124 through belt 126 and belts 128, 130, respectively, as depicted in FIG. 2. When driven by the motor 124, the rollers 92 and 94 act against the photographic materials to progressively introduce sections of the elongated strip 42 into the cassette's section 38 in which they are coiled under the action of the friction roller 112. Just before being introduced into the cassette 34 from the camera's imbibition station 82, the strip of photographic materials 42 passes over a roller 132 which serves, in conjunction with the tensioning force exerted on the elongated strip by the friction roller 112, to maintain the proper alignment of such strip within the imbibition station 82 and to facilitate a small amount of displacement of the elongated strip in the direction away from the back 18 of the camera 12 as it moves from the imbibition station into the cassette's elongated opening 110. The purpose of this last stated function of the roller 132 will be more fully explained hereinafter.

Energy for the motor 124 is provided by a battery 134 housed within the cassette's first section 36 (See FIG. 1). In this connection, electrical terminals (not shown) are appropriately provided on the cassette 34 and within the camera 12 to automatically connect the battery 134 to the motor 124 through a conventional circuit (not fully shown) including a button 158 whenever the cassette is seated in the camera's compartment 32. It is to be understood that the camera system 10 may incorporate other automatic devices, such as an automated exposure control system, which are also adapted to be energized by the battery 134 of the cassette 34. Advantageously, in this arrangement the camera is provided with a fresh energy source each time it is loaded with film. Additionally, intimate association of the battery 134 with a film retaining cassette holds particular advantage as a result of the film packaging techniques common in the industry. Each loaded film cassette is hermetically sealed within a light-tight moisture-proof container. Further, the film is conventionally stored at a controlled low temperature for limited periods of time prior to being released for purchase by the consuming public. This combination of protection from an external influence by packaging along with storage for limited periods under ideal temperature conditions greatly enhances the reliability of the power source provided by the battery 134. In the same light, the battery 134 will be utilized within the relatively short period of time required to exhaust the nominal number of exposures represented by the photosensitive image-recording sheets 44 initially packaged in the cassette 34.

Figure 5:
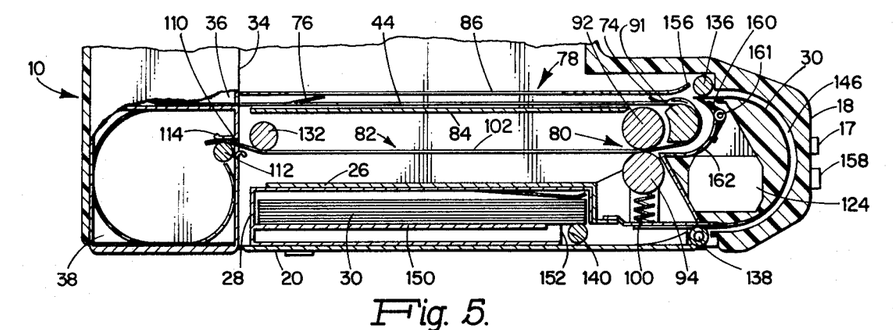
FIG. 5 is a fragmentary view similar to FIG. 3 at such time as the first image-receiving sheet is being advanced towards the first exposed image-recording sheet.
Figure 6:
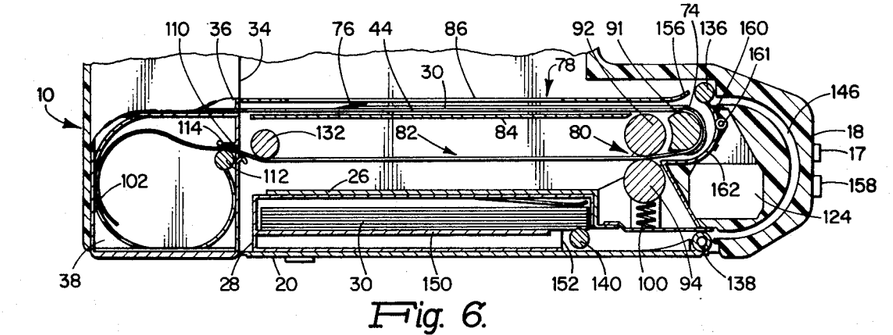
FIG. 6 is a view similar to FIG. 5 at such time as the first image-receiving and image-recording sheets are being advanced in superposition towards the camera's processing station.

The camera 12 further includes a plurality of rollers 136, 138 and 140 which are adapted to be driven by the motor 124 through belts 142, 128 and 144 (See FIG. 2) to effect, in conjunction with a guide track 146, a certain desired sequential advancement of the image-receiving sheets 30 from their initial position within the magazine 28. In this connection, it will be noted that each magazine 28 includes a plate 150 (See FIG. 3) on which the discrete image-receiving sheets 30 are disposed in a stacked array. This plate 150 is positioned within the magazine 28 so that the sheet 30 adjacent thereto may be slid therealong in the direction away from the cassette 34 through a cut-out section 152 of the magazine into the guide track 146. Further in this connection, it will be noted that when the magazine 28 is fully inserted into the bracket 26, the camera's roller 140 is disposed within its cut-out section 152 in contact with the leading edge of that image-receiving sheet 30 seated against the plate 150. Also, the magazine 28 includes a leaf spring 154 which, at such time, serves to press the leading edges of the sheets 30 towards the roller 140 thus establishing substantial frictional forces between that roller and the foremost image-receiving sheet 30 seated against the plate 150. Consequently, whenever the rollers 140, 138 and 136 are energized, an image-receiving sheet 30 seated against the plate 150 will be advanced from the magazine 28 through its cut-out section 152 and thence along the guide track 146 towards the camera's exposure station 78 (See FIG. 5). As the leading edge of the image-receiving sheet 30 is advanced past the roller 136, it is introduced under a curled edge 156 of the picture framing plate 86 so as to be ultimately disposed within the exposure station 78 between that plate and the section of the elongated strip of photographic materials 42 positioned on the support plate 84 (See FIG. 6). As previously implied, the motor 124 is selectively energized with power from the battery 134 responsive to the operator's depressing the button 158 conveniently mounted on the housing of the camera 12.

The driving arrangement for the various film advancing rollers of the camera 12 preferably is such as to commence the movement of the exposed sheet of image-recording material 44 disposed on the support plate 84 from the exposure station 78 simultaneously as a sheet of image-receiving material 30 commences its movement from the magazine 28. Further, this preferred arrangement is such that movement of the image-receiving sheet 30 is much more rapid than the movement of the elongated strip of photographic materials 42. More specifically, the rollers 140, 138 and 136 effect an advancement of the sheet 30 beyond the last stated roller prior to such time as the exposed image-recording sheet 44 from the exposure chamber 78 comes under the influence of the guide track arrangement 90 (See FIG. 6). Conventional means may be employed for accomplishing this desired result.

As the image-receiving sheet 30 is rapidly advanced into the exposure station 178, its leading edge is engaged by the trapping sheet 76 associated with the exposed image-recording sheet leaving the exposure station 78, while its trailing edge is seated over the bib 74 associated with the pod assembly 46 in advance of that particular image-recording sheet. Thereafter, the elongated strip of photographic material 42 carries that particular image-receiving sheet 30 in superposed relationship through the camera's processing station 80 into its imbibition station 82. In this respect, it will be noted that the guide track arrangement 90 includes a first section 160 which is pivotally connected to a second section 162 thereof by a hinge 165. Mounted on this hinge 165 is a spring 166 that is connected to the first and second sections 160 and 162 of the guide track arrangement 90 so as to continually urge the free edge 168 of its first section 160 into contact with the roller 136. The action of this spring arrangement for the track sections 160 and 162 is such as to permit image-receiving sheets 30 to be advanced from the magazine 28 along the guide track 146 past the roller 136 and, thereafter, to allow such sheets to advance with the elongated strip of photographic materials 42 along the guide track arrangement 90. Obviously, relative movement of the image-receiving sheets 30 and the elongated strip of photographic materials 42 is such that each of the former sheets clears the roller 136 prior to the time that the exposed image-recording sheet 44 over which it is superposed has come under the influence of the guide track 90.

It is also important to note that conventional means (not shown) which may, for instance, comprise a timing belt drive having teeth along a portion of its length, are employed to drive the roller 140 for only a portion of the time that the rollers 138 and 136 are driven. More specifically, once a particular sheet of image-receiving material 30 from the magazine 28 has cleared the roller 140, motion of that roller is discontinued. The purpose for this arrangement is to preclude the advancement of the next image-receiving sheet 30 from the magazine 28 during the processing of the one exposed image-recording sheet 44 within the camera 12 and until such time it is desired to process the next exposed image-recording sheet.

As an exposed image-recording sheet 44 and an image-receiving sheet 30 are advanced in superposed relationship through the camera's processing station 80, the action of the rollers 92 and 94 thereon first effects a rupturing of the fluid filled pod or container 58 in advance thereof and the subsequent distribution of the fluid 60 released therefrom between such superposed sheet materials. Preferably, a "resist" is imprinted or otherwise formed around the peripheral border of the face of each image-receiving sheet 30 adapted to be contacted by the processing fluid 60. This resist may comprise an acrylic plastic material, such as Krylon manufactured by Krylon, Inc. of Norristown, Pa., or any other material which will function to preclude the adherence of any of the fluid 60 thereto and any adverse discoloring of the border of the sheet 30 by that fluid. When the rollers 92 and 94 have effected an advancement of the superposed sheets 30 and 44 into the camera's imbibition station 82 (See FIG. 7), the motor 124 is automatically de-energized by conventional means (not shown). At such time, the next image-recording sheet 44 of the elongated strip 42 has been positioned within the camera's station 78 so as to be available for its subsequent exposure (See FIG. 7).

When the superposed sheets 30 and 44 are disposed within the camera's imbibition station as shown in FIG. 7, the orientation of the elongated strip 42 around the roller 132 towards the cassette's elongated opening 110 is such as to draw the leading edge of the exposed sheet 44 away from the leading edge 170 of its superposed sheet 30. Consequently after sufficient time has elapsed, for instance on the order of 60 seconds when producing a full-color print, the operator may open the camera's door 20 and strip the image-receiving sheet 30 from its superposed image-recording sheet 44 by pulling on its leading edge 170. The operator is thus provided with a waste-free, fully developed photographic print. Conventional means (not shown) are provided for light-sealing the imbibition station 82 from the exposure station 78 to preclude undesirable exposure of the particular image-recording sheet 44 disposed within the camera's latter station at such time as the door 20 is opened to facilitate the removal of a finished print from its former station. Each time subsequently exposed image-recording sheets 44 are advanced from the camera's exposure station 78, expended portions of the elongated strip of photographic materials 42 are coiled within the cassette's second section 38 by the action of the friction roller 112 under the influence of the clockspring 116.

OPERATION OF THE PREFERRED EMBODIMENT

To briefly summarize the operation of the present invention, the camera 12 is loaded by inserting a magazine 28, containing a fresh supply of image-receiving sheets 30, into the bracket 26 and by inserting a cassette 34, containing a fresh elongated strip of photographic materials 42 and battery 134, inserted into the camera's compartment 32 (See FIG. 2). With the door 20 in its fully opened position, the operator grips the elongated strip's leader 102 and slides it along the slot 106 of the support plate 84 into a position wherein the tab 108 attached thereto becomes exposed (See FIG. 1). The operator then pulls the tab 108 along the slot 106, grips the leader 102 as it extends across the roller 92 into the imbibition station 82, and inserts the leading edge of that leader into the elongated opening 110 of the cassette's second section 38 (See FIG. 3). At such time, the first photosensitive image-recording sheet 44 of the elongated strip of photographic materials 42 is disposed within the camera's station 78 in position ready for its exposure. After this sheet 44 is exposed responsive to the operator's depressing the shutter release button 17, its processing is initiated by the depression of the button 158. In this connection, the first image-receiving sheet 30 is advanced from the magazine 28 into superposed relationship with the exposed image-recording sheet 44 (See FIGS. 5 and 6) prior to the latter's coming under the influence of the guide track arrangement 90 and such superposed sheets are advanced through the camera's processing station 80 into its imbibition station 82 (See FIG. 7). At this time, the second photosensitive image-recording sheet 44 of the elongated strip of photographic materials 42 is positioned within the camera station 78 so as to be available for the next camera exposure operation. After a sufficient period of time has elapsed to complete the imbibition process, the operator opens the camera's door 20 and removes the first image-receiving sheet 30 which now constitutes a fully developed photographic print. The camera's door 20 is then returned to its closed position.

Subsequent photographic prints are produced from the unexposed image-recording sheets 44 and image-receiving sheets 30 remaining within the camera system 10 by merely selectively depressing the shutter release button 17 to effect an exposure, depressing the button 158 to effect its processing and then removing the finished photographic print from the camera in the manner stated. During these operations, the expended portions of the elongated strip of photographic materials 42 are continually coiled within the cassette's second section 38. Once all of the photographic materials included in the magazine 28 and the cassette 34 have been expended in producing photographic prints, the magazine and cassette may be removed from the camera 12 and replaced with a fresh supply of such components as convenient.

Those familiar with the photographic arts will readily appreciate the novel and highly unique advantages of this camera system. It will be apparent that a system is provided which facilitates the complete fulfillment of all of the above-mentioned objectives of the invention. Most importantly, this system produces photographic prints in a relatively simple, highly efficient, waste-free manner employing simplified film materials.

This invention may be practiced or embodied in other ways without departing from the spirit or essential character thereof. For instance, a single such camera system may be alternately employed to produce black-and-white or full-color prints by substituting the stepped fluid spreading rollers described in the applicants' copending application Ser. No. 51,170, filed on June 30, 1970, entitled Stepped Photographic Processing Fluid Spreading Apparatus for the spreader rollers 92 and 94 of the illustrated embodiment. The preferred embodiment described herein is therefore illustrative and not restrictive, the scope of the invention being indicated by the appended claims and all variations which come within the meaning of the claims are intended to be embraced therein.

What is claimed is:

1. A camera system of the self-developing type adapted to employ an elongated strip of photographic materials comprising alternately spaced photosensitive image-recording sheets and pod assemblies, each such pod assembly including a container of processing fluid adapted to release such fluid onto one such image-recording sheet responsive to a compressive force being applied thereto, and a plurality of discrete image-receiving sheets each substantially coextensive in area with respect to one such image-recording sheet, comprising:
   first means for receiving such elongated strip of photographic materials;
   second means for receiving a supply of such image-receiving sheets disposed in a stacked array;
   an exposure station;
   a processing station including means for applying a compressive force to such elongated strip of photographic materials as it is advanced therethrough;
   an imbibition station;
   third means for progressively advancing such elongated strip of photographic materials from said first means through said exposure station, through said processing station and into said imbibition station; and
   fourth means for removing one of such image-receiving sheets from such stacked array and for superposing it over a respective such image-recording sheet after exposure thereof and prior to advancement thereof through said processing station, whereby such fluid is distributed between each pair of such superposed sheets as they advance through said processing station and the processing of such superposed sheets by such fluid to produce a viewable image in such image-receiving sheet thereof is completed in said imbibition station.

2. The camera system of claim 1 additionally including fifth means for storing such elongated strip of materials as it is progressively expended within said camera in producing viewable images in such image-receiving sheets.

3. The camera system of claim 2 additionally including sixth means for making such image-receiving sheets available to the operator of said camera after processing thereof with such fluid has been completed within said imbibition station.

4. The camera system of claim 1 wherein said fourth means commences movement of each such image-receiving sheet from said second means into superposition with one such exposed sheet of image-recording material simultaneously as said third means is advancing such latter sheet from said exposure station towards said processing station.

5. The camera system of claim 1 additionally comprising a lens system for imaging light rays from a subject onto such photosensitive image-recording sheets as they are sequentially positioned within said exposure station and wherein said imbibition station is located on the opposite side of said exposure station from said lens system.

6. The camera system of claim 1 wherein such elongated strip of photographic materials is initially contained in a cassette and said first means comprises means for removably receiving such cassette.

7. A camera system comprising:
   a cassette including:
      a housing having first and second sections, at least said first section being light-tight;
      an elongated strip of photographic materials, comprising alternately spaced photosensitive image-recording sheets and pod assemblies, each said pod assembly including a container initially retaining processing fluid and adapted to release said fluid onto one said image-recording sheet responsive to a compressive force being applied thereto, initially coiled within said first section of said housing;
      aperture defining means on said first section of said housing through which said elongated strip may be progressively withdrawn from said housing; and
      aperture defining means on said second section of said housing through which said elongated strip of photographic materials may be progressively introduced into said second section of said housing after having been withdrawn from said first section thereof; and
   a camera including:
      means for removably receiving said cassette;
      means for receiving a supply of discrete image-receiving sheets;
      an exposure station;
      a processing station including means for applying a compressive force to said elongated strip of photographic materials as it is advanced therethrough;
      an imbibition station;
      means for progressively withdrawing said elongated strip of photographic materials from said first section of said cassette and advancing said elongated strip through said exposure station, through said processing station, through said imbibition station, and subsequently introducing same into said second section of said cassette; and
      means for superposing one of said image-receiving sheets over a respective said image-recording sheet after exposure of the latter and prior to its advancement through said processing station, whereby said fluid is distributed between each pair of said superposed sheets as they advance through said processing station, the processing of said superposed sheets by said fluid to produce a viewable image in said image-receiving sheet thereof is completed in said imbibition station, and said elongated strip of photographic materials is stored in said second section of said cassette after having been expended within said camera in producing said viewable images.

8. A disposable cassette for use in a self-developing camera having means for removably receiving said cassette and means for progressively withdrawing an elongated strip of photographic materials from said cassette and progressively advancing said elongated strip of photographic materials through a plurality of stations of such camera, including at least an exposure station and a processing station, wherein such strip is progressively expended in producing photographic prints comprising:

a housing having first and second sections, at least said first section being light-tight, said housing being configured for removable insertion into such receiving means of such self-developing camera;

an elongated strip of photographic materials, comprising alternately placed photosensitive image-recording sheets and pod assemblies, each such pod assembly including a container initially retaining processing fluid and adapted to release said fluid on to one said image-recording sheet and passing through such processing station, initially coiled within said first section of said housing;

aperture defining means on said first section of said housing through which said elongated strip may be progressively withdrawn from said housing by such withdrawing and advancing means of such camera; and aperture defining means on said second section of said housing through which said elongated strip may be progressively introduced into the said second section of said housing by such advancing means of such camera after passing through such stations, whereby said elongated strip of photographic materials is stored in said second section of said cassette after having been expended within such camera in producing photographic prints.

9. A cassette for use in a self-developing camera having means for removably receiving said cassette, means for receiving a supply of discrete image-receiving photographic sheets, an exposure station, a processing station, an imbibition station, means for progressively advancing an elongated strip of photographic materials including a plurality of image-recording sheets through said exposure station, said processing station, and said imbibition station, and means for superpositioning one such image-receiving sheet over each such image-recording sheet after exposure of the latter and prior to the advancement thereof through said processing station, comprising:

a housing having first and second sections, at least said first section being light-tight;

an elongated strip of photographic materials, comprising alternately spaced photosensitive image-recording sheets and pod assemblies, each said pod assembly including a container initially retaining processing fluid and adapted to release said fluid onto one said image-recording sheet in passing through such processing station, initially coiled within said first section of said housing;

aperture defining means on said first section of said housing through which said elongated strip may be progressively withdrawn from said housing by such advancing means of such camera; and aperture defining means on said second section of said housing through which said elongated strip of photographic materials may be progressively introduced into said second section of said housing by such advancing means of such camera after passing through such imbibition station of such camera, whereby said elongated strip of photographic materials is stored in said second section of said cassette after having been expended within such camera in producing visible images on such image-receiving sheets.

10. The invention of claim 9 wherein a function performed by such camera is adapted to be energized by battery means and said cassette additionally includes battery means for supplying the energy required to perform such camera function.

11. The invention of claim 9 wherein such camera additionally includes a motor for driving at least such advancing means and said cassette additionally includes means for energizing such motor.

12. The invention of claim 9 additionally including means within said cassette for continually exerting a force on said elongated strip tending to draw said elongated strip into said second section thereof once the leading end of said elongated strip has been introduced into said second section by such advancing means.

13. A camera system of the self-developing type adapted to employ an elongated strip of photographic materials comprising alternately spaced photosensitive image-recording sheets and pod assemblies, each such pod assembly including a container of processing fluid adapted to release such fluid onto one such image-recording sheet responsive to a compressive force being applied thereto, and a plurality of discrete image-receiving sheets each substantially coextensive in area with respect to one such image-recording sheet, comprising:

first means for receiving such elongated strip of photographic materials;

second means for receiving a supply of such image-receiving sheets;

an exposure station;

a lens system for imaging light rays from a subject onto such photosensitive image-recording sheets as they are sequentially positioned within said exposure station;

a processing station including means for applying a compressive force to such elongated strip of photographic materials as it is advanced therethrough;

an imbibition station located on the opposite side of said exposure station from said lens system;

third means for progressively advancing such elongated strip of photographic materials from said first means through said exposure station, through said processing station and into said imbibition station, said third means including guide means located intermediate said exposure station and said imbibition station for reversing the direction of movement of said elongated strip of photographic materials approximately 180°; and fourth means for superposing one of such image-receiving sheets over each of such image-recording sheets after exposure thereof and prior to such image-recording sheet coming under the influence of said guide means and being advanced by said third means from said exposure station into said processing station, whereby such fluid is distributed between each pair of such superposed sheets as they advance through said processing station and the processing of such superposed sheets by such fluid to produce a viewable image in such image-receiving sheet thereof is completed in said imbibition station.

14. The camera system of claim 13 wherein said guide means is located intermediate said exposure station and said processing station.

15. A camera system of the self-developing type adapted to employ an elongated strip of photographic materials comprising alternately spaced photosensitive image-recording sheets and pod assemblies, each such pod assembly including a container of processing fluid adapted to release such fluid onto one such image-recording sheet responsive to a compressive force being applied thereto, and a plurality of discrete image-receiving sheets each substantially coextensive in area with respect to one such image-recording sheet, comprising:
  first means for receiving such elongated strip of photographic materials;
  second means for receiving a supply of such image-receiving sheets;
  an exposure station;
  a processing station including means for applying a compressive force to such elongated strip of photographic materials as it is advanced therethrough;
  an imbibition station;
  third means for progressively advancing such elongated strip of photographic materials from said first means through said exposure station, through said processing station and into said imbibition station;
  fourth means for superposing one of such image-receiving sheets over each of such image-recording sheets after exposure thereof and prior to advancement thereof through said processing station, whereby such fluid is distributed between each pair of such superposed sheets as they advance through said processing station and the processing of such superposed sheets by such fluid to produce a viewable image in such image-receiving sheet thereof is completed in said imbibition station;
  fifth means for storing such elongated strip of materials as it is progressively expended within said camera in producing viewable images in such image-recording sheets; and
  sixth means for making such image-receiving sheets available to the operator of said camera after processing thereof with such fluid has been completed within said imbibition station, said sixth means including a door with said second means mounted thereon.

16. A camera system of the self-developing type adapted to employ an elongated strip of photographic materials comprising alternately spaced photosensitive image-recording sheets and pod assemblies, each such pod assembly including a container of processing fluid adapted to release such fluid onto one such image-recording sheet responsive to a compressive force being applied thereto, and a plurality of discrete image-receiving sheets each substantially coextensive in area with respect to one such image-recording sheet, comprising:
  first means for receiving such elongated strip of photographic materials;
  second means for receiving a supply of such image-receiving sheets;
  an exposure station;
  a lens system for imaging light rays from a subject onto such photosensitive image-recording sheets as they are sequentially positioned within said exposure station;
  a processing station including means for applying a compressive force to such elongated strip of photographic materials as it is advanced therethrough;
  an imbibition station located on the opposite side of said exposure station from said lens system;
  third means for progressively advancing such elongated strip of photographic materials from said first means through said exposure station, through said processing station and into said imbibition station;
  fourth means for superposing one of such image-receiving sheets over each of such image-recording sheets after exposure thereof and prior to advancement thereof through said processing station, whereby such fluid is distributed between each pair of such superposed sheets as they advance through said processing station and the processing of such superposed sheets by such fluid to produce a viewable image in such image-receiving sheet thereof is completed in said imbibition station; and
  a door adjacent said imbibition station having said second means mounted thereon.

17. A camera system of the self-developing type adapted to employ an elongated strip of photographic materials comprising alternately spaced photosensitive image-recording sheets and pod assemblies, each such pod assembly including a container of processing fluid adapted to release such fluid onto one such image-recording sheet responsive to a compressive force being applied thereto, and a plurality of discrete image-receiving sheets each substantially coextensive in area with respect to one such image-recording sheet, comprising:
  a cassette having first and second sections, such elongated strip of photographic materials being initially retained within said first section of said cassette;
  first means for removably receiving said cassette;
  second means for receiving a supply of such image-receiving sheets;
  an exposure station;
  a processing station including means for applying a compressive force to such elongated strip of photographic materials as it is advanced therethrough;
  an imbibition station;

third means for progressively advancing such elongated strip of photographic materials from said first section of said cassette through said exposure station, through said processing station, through said imbibition station and thence into said second section of said cassette; and fourth means for superposing one of such image-receiving sheets over each of such image-recording sheets after exposure thereof and prior to advancement thereof through said processing station, whereby such fluid is distributed between each pair of such superposed sheets as they advance through said processing station and the processing of such superposed sheets by such fluid to produce a viewable image in such image-receiving sheet thereof is completed in said imbibition station with such elongated strip of materials being stored in said second section of said cassette as it is progressively expended within said camera in producing viewable images in such image-recording sheets.

18. A camera system of the self-developing type adapted to employ an elongated strip of photographic materials comprising alternately spaced photosensitive image-recording sheets and pod assemblies, each such pod assembly including a container of processing fluid adapted to release such fluid onto one such image-recording sheet responsive to a compressive force being applied thereto, and a plurality of discrete image-receiving sheets each substantially coextensive in area with respect to one such image-recording sheet, comprising:

an objective lens;

first means for receiving such elongated strip of photographic materials;

an exposure station aligned with said lens;

second means for receiving a supply of such image-receiving sheets disposed in a stacked array on the opposite side of said exposure station from said lens;

a processing station including means for applying a compressive force to such elongated strip of photographic materials as it is advanced therethrough;

third means for progressively advancing such elongated strip of photographic materials from said first means through said exposure station, and then through said processing station; and fourth means for removing one of said image-receiving sheets from such stacked array and for superposing it over a respective such image-recording sheet after exposure thereof and prior to advancement thereof through said processing station, whereby such fluid is distributed between each pair of such superposed sheets as they advance through said processing station.

19. A disposable cassette for use in a self-developing camera having means for removably receiving said cassette and means for progressively withdrawing an elongated strip of photographic materials from said cassette and progressively advancing said elongated strip of photographic materials through a plurality of stations of such camera, including at least an exposure station and a processing station, wherein such strip is progressively expended in producing photographic prints comprising:

a housing having first and second sections, at least said first section being light-tight, said housing being configured for removable insertion into such receiving means of such self-developing camera;

an elongated strip of photographic materials initially coiled within said first section of said housing;

aperture defining means on said first section of said housing through which said elongated strip may be progressively withdrawn from said housing by such withdrawing and advancing means of such camera;

aperture defining means on said second section of said housing through which said elongated strip may be progressively introduced into the said second section of said housing by such advancing means of such camera after passing through such stations, whereby said elongated strip of photographic materials is stored in said second section of said cassette after having been expended within such camera in producing photographic prints; and spring means within said cassette for continually inserting a force on said elongated strip tending to draw said elongated strip into said second section thereof once the leading end of said elongated strip has been introduced into said second section by such advancing means.

20. A disposable cassette for use in a battery-powered self-developing camera having means for removably receiving said cassette and means for progressively withdrawing an elongated strip of photographic materials from said cassette and progressively advancing said elongated strip of photographic materials through a plurality of stations of such camera, including at least an exposure station and a processing station, wherein such strip is progressively expended in producing photographic prints comprising:

a housing having first and second sections, at least said first section being light-tight, said housing being configured for removable insertion into such receiving means of such self-developing camera;

an elongated strip of photographic materials initially coiled within said first section of said housing;

aperture defining means on said first section of said housing through which said elongated strip may be progressively withdrawn from said housing by such withdrawing and advancing means of such camera;

aperture defining means on said second section of said housing through which said elongated strip may be progressively introduced into the said second section of said housing by such advancing means of such camera after passing through such stations, whereby said elongated strip of photographic materials is stored in said second section of said cassette after having been expended within such camera in producing photographic prints; and battery means for supplying the power required by such camera.

* * * * *